Aug. 1, 1939.         H. E. TAUTZ         2,168,282
CIRCULAR SAW
Filed Dec. 18, 1936     4 Sheets-Sheet 1
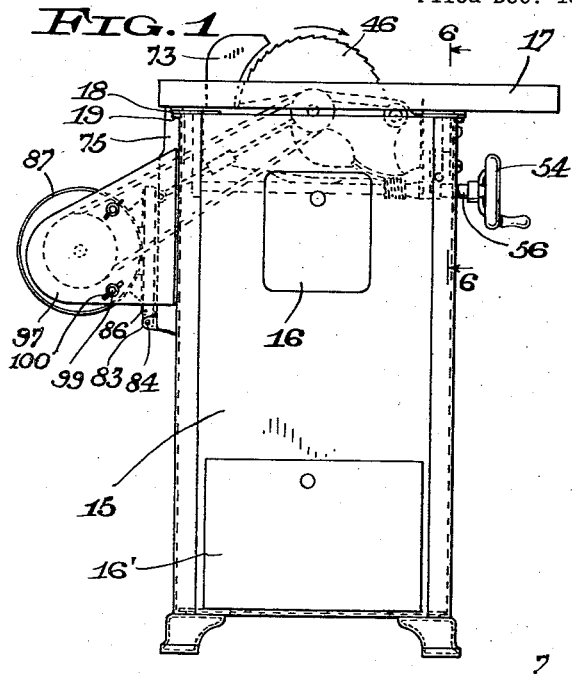
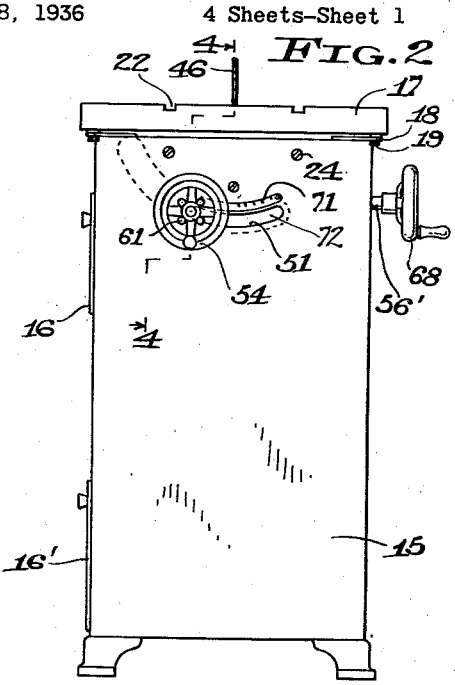
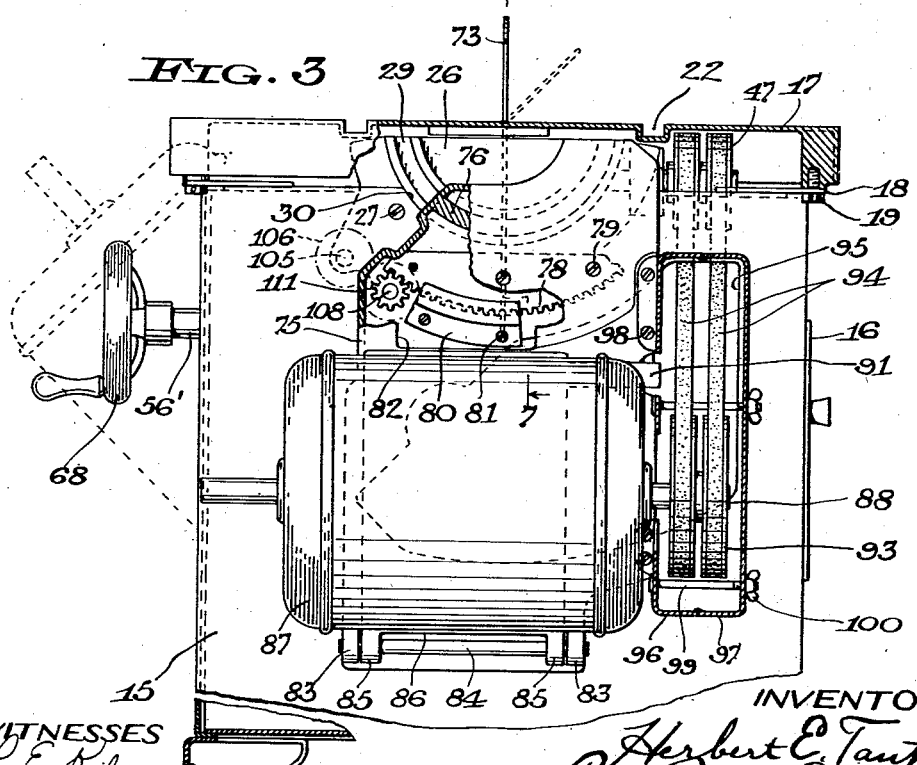
INVENTOR
Herbert E. Tautz
By R. S. Caldwell
ATTORNEY
WITNESSES
L. E. Kilian
C. L. Naal Aug. 1, 1939.   H. E. TAUTZ   2,168,282
CIRCULAR SAW
Filed Dec. 18, 1936   4 Sheets-Sheet 2
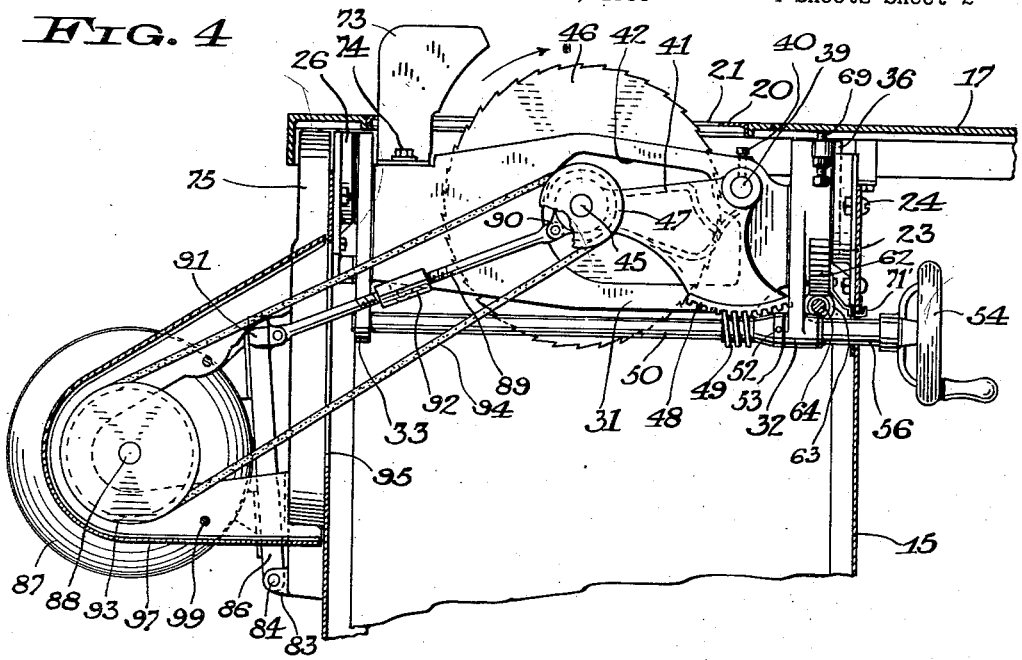
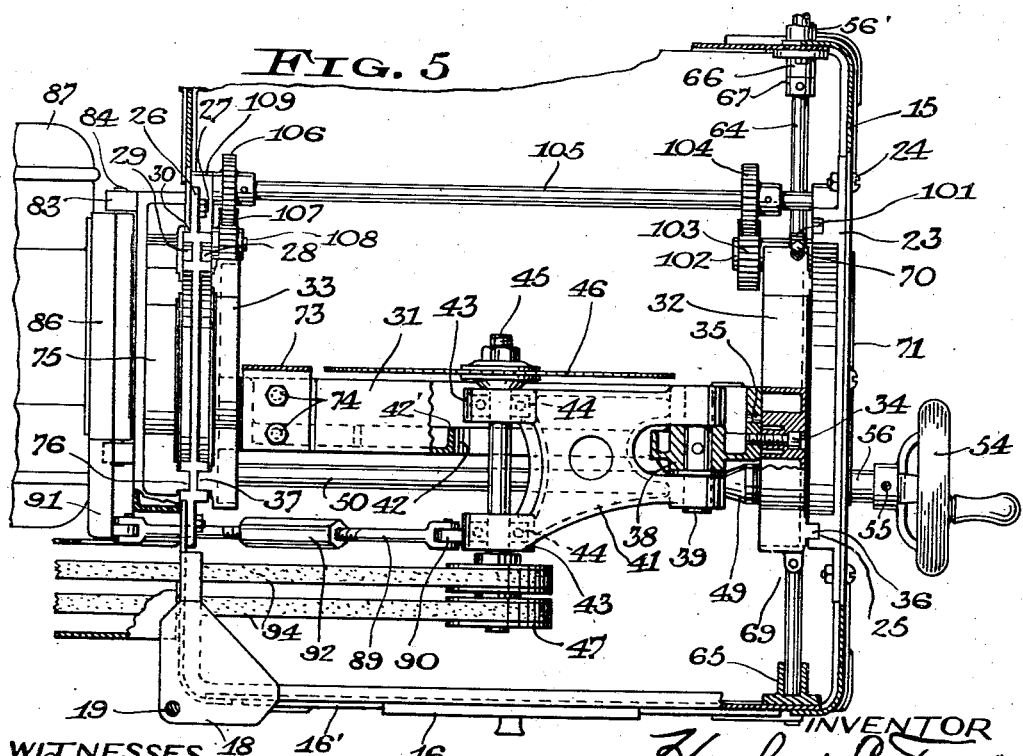

Aug. 1, 1939.  H. E. TAUTZ  2,168,282
CIRCULAR SAW
Filed Dec. 18, 1936   4 Sheets-Sheet 3
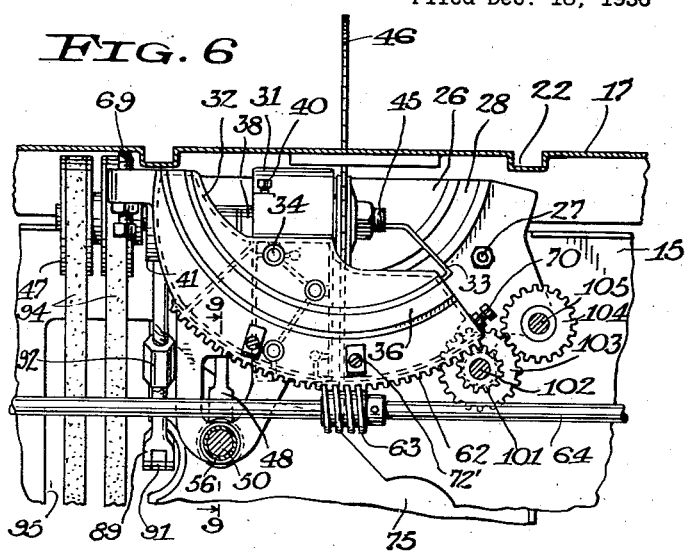
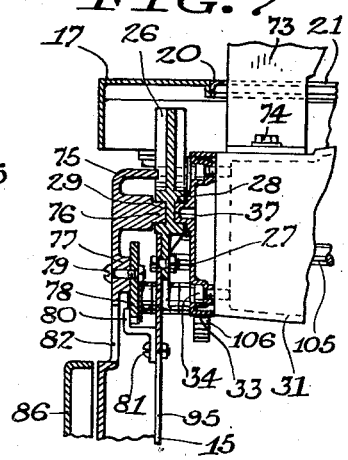
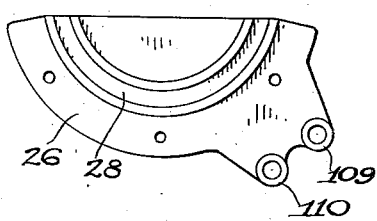
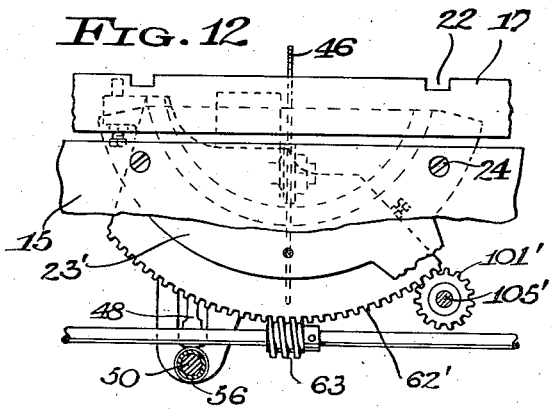
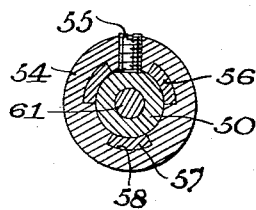
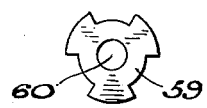
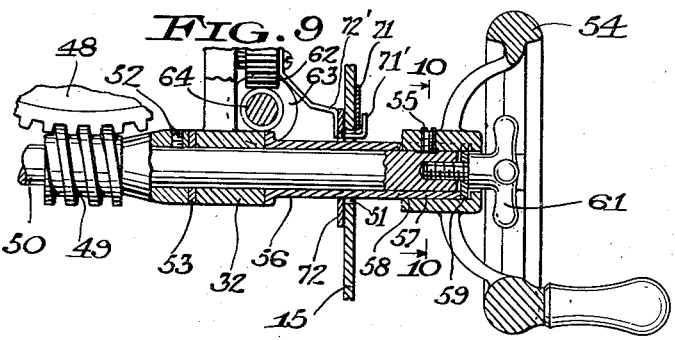
WITNESSES
L. E. Kilian
C. L. Waal
INVENTOR
Herbert E. Tautz
By R. S. Caldwell
ATTORNEY Aug. 1, 1939.  H. E. TAUTZ  2,168,282
CIRCULAR SAW
Filed Dec. 18, 1936  4 Sheets-Sheet 4
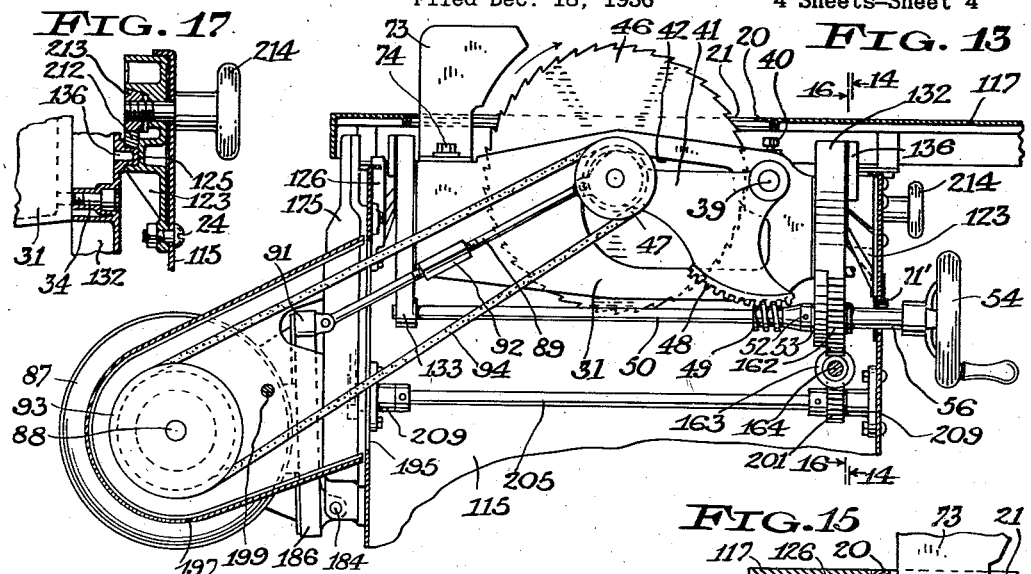
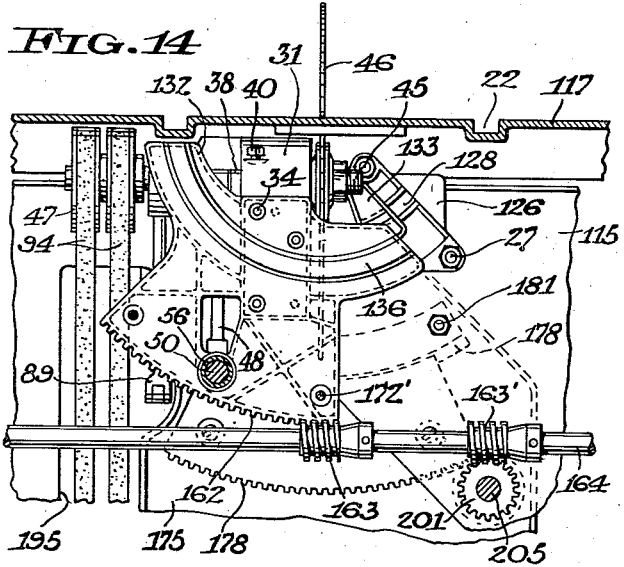
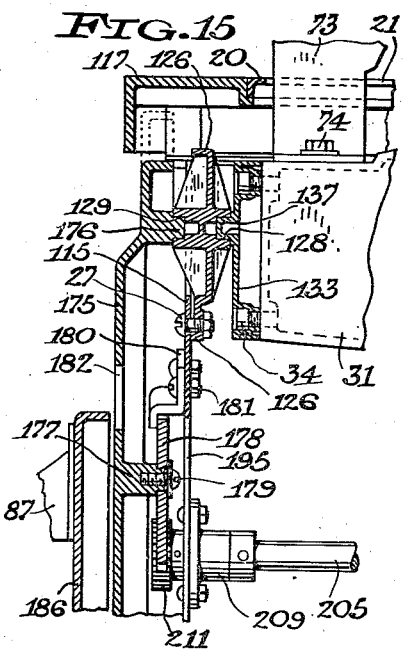
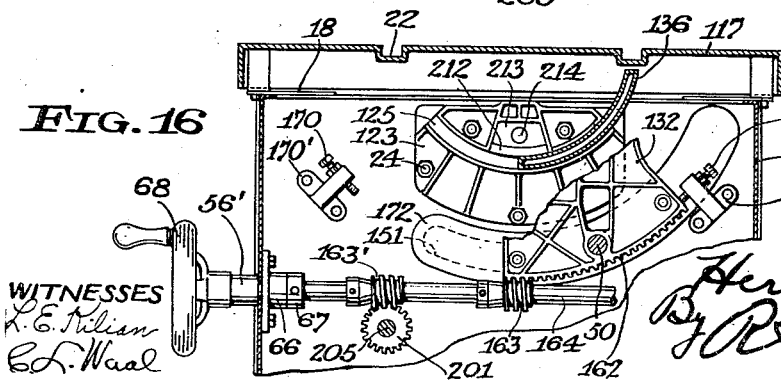
INVENTOR
Herbert E. Tautz
By J. R. S. Caldwell
ATTORNEY
WITNESSES
L. E. Kilian
E. L. Waal Patented Aug. 1, 1939

2,168,282

UNITED STATES PATENT OFFICE 2,168,282

CIRCULAR SAW

Herbert E. Tautz, Milwaukee, Wis., assignor to The Delta Manufacturing Company, Milwaukee, Wis., a corporation of Wisconsin Application December 18, 1936, Serial No. 116,576

7 Claims. (Cl. 143—36)

The invention relates to circular saws, and more particularly to circular saws of the tilting arbor type.

It has been usual in circular saws of the tilting arbor type to place the saw arbor and driving motor therefor on the same tiltable support, which has subjected the support and its pivotal mounting to a relatively heavy load. In other cases, the saw has been belt-driven from a counter-shaft or non-tilting motor, necessitating twisting of the driving belt when the arbor is tilted.

An object of the invention is to provide a circular saw or the like in which the cutter arbor and a driving motor therefor are carried on separate tiltable supports, so as to relieve the arbor mounting of excessive weight and torsional stresses, both supports being tiltable together to maintain the same relative position of the arbor and motor.

Another object of the invention is to provide a circular saw or the like in which the driving motor support is tiltably mounted at the rear of the frame or housing of the machine.

A further object of the invention is to provide a circular saw or the like having simple but effective means for maintaining the tension of a driving belt in the various positions of the cutter.

A further object is to provide easily operated controlling means for adjusting the angle and projection of the cutter.

A further object is to provide a trunnion mounting for the cutter which is of strong but inexpensive construction and is readily assembled.

A further object is to perfect details of construction generally.

The invention further consists in the several features hereinafter described and claimed.

In the accompanying drawings, illustrating certain embodiments of the invention, Fig. 1 is a side elevation of a circular saw constructed in accordance with the invention;

Fig. 2 is a front elevation of the saw;

Fig. 3 is a rear elevation of the saw, parts being broken away and parts being shown in section, and a tilted position of the saw and driving motor being indicated by dotted lines;

Fig. 4 is a sectional elevation taken generally along the line 4—4 of Fig. 2;

Fig. 5 is a top plan view of the saw with the table removed, parts being broken away and parts being shown in section;

Fig. 6 is a sectional elevation taken generally along the line 6—6 of Fig. 1;

Fig. 7 is a sectional elevation taken generally along the line 7—7 of Fig. 3;

Fig. 8 is a front elevation of a rear trunnion bracket;

Fig. 9 is a detail sectional elevation of a saw adjusting means, taken along the line 9—9 of Fig. 6;

Fig. 10 is a sectional view taken along the line 10—10 of Fig. 9;

Fig. 11 is a detail view of a clamping washer;

Fig. 12 is a front view of a modified form of saw, parts being broken away and parts being shown in section;

Fig. 13 is a view similar to Fig. 4 but showing another modified form of circular saw machine;

Fig. 14 is a sectional view taken generally along the line 14—14 of Fig. 13;

Fig. 15 is a sectional view similar to Fig. 7 but showing the machine of Fig. 13;

Fig. 16 is a sectional view taken generally along the line 16—16 of Fig. 13, and Fig. 17 is a sectional elevation of the front trunnion mounting of the machine of Fig. 13.

In that form of the invention shown in Figs. 1 to 11, 15 designates a legged frame, preferably in the form of an upright housing of rectangular cross-section closed on all four sides and on the bottom. The frame here shown is adapted to set on a floor, but it will be obvious that by reducing the height of the frame it can be mounted on a bench. One side wall of the frame is provided with an inspection door 16. One of the side walls has another door 16' at its lower portion to admit a sawdust-collecting carton, not shown, onto the floor or bottom of the frame.

A table 17 rests on apertured gusset plates 18 secured, as by welding, to the upper flanged corner portions of the frame, the table being rigidly secured to the gusset plates by screws 19. The table is provided with the usual detachable soft metal insert plate 20 presenting a saw slot 21, and is further provided with the usual gage grooves 22 parallel to the saw slot. The usual work-guiding fence (not shown) may also be fitted. The table when secured to the frame serves to stiffen the frame, and, in effect, forms a part of the frame. Certain features of the housing or frame construction are described and claimed in my copending application for Machine cabinets, Serial No. 245,199, filed December 12, 1938.

A trunnion bracket 23 is rigidly secured by screws 24 to the inner face of the front wall of the frame 15 and has a rearwardly opening arcuate groove 25. A somewhat similar trunnion bracket 26 is rigidly secured by screws 27 to the front face of the rear wall of the frame and has a forwardly opening arcuate groove 28 and also a rearwardly opening arcuate groove 29, the rear wall of the frame having an arcuate recess 30 to expose the latter groove. The arcuate grooves 25, 28 and 29 are concentric with an axis lying substantially in the top plane of the table and extending from front to rear centrally of the saw slot 21.

A marginally flanged, internally ribbed, cast metal yoke or support 31 extends between the trunnion brackets and has respective front and rear trunnions 32 and 33 rigidly secured to its parallel vertical end flanges by screws 34, the trunnions further having dowelled connections 35 (Fig. 5) with the yoke to insure accurate assembly. Each of the trunnions is of hollow, internally ribbed construction. The front trunnion has an arcuate rib 36 fitting in the groove 25 of the front trunnion bracket 23, and the rear trunnion has a similar rib 37 fitting in the groove 28 of the rear trunnion bracket 26. The trunnioned yoke, which forms a tiltable carriage, fits closely against the trunnion brackets so as to prevent longitudinal movement. Preferably, the front and rear trunnion ribs 36 and 37 are of substantially different radius so as to minimize any tendency toward weaving or twisting of the trunnioned yoke with respect to the trunnion brackets. If desired the trunnions and trunnion brackets may be of die-cast construction.

The yoke 31 has a web at one side provided with a boss 38, preferably near the front of the yoke, in which a pin 39 is secured by a set-screw 40, the axis of the pin extending transversely of the tilting axis of the yoke. A swingable member or arm 41 has a forked end embracing the boss 38 and journalled on the pin 39 and extends in an opening 42 formed in the flat web of the yoke, the opening being defined by an inturned flange 42' (Fig. 5). The outer end of the arm is also forked and carries spaced bosses 43 in which respective aligned ball bearings 44 are mounted. A saw arbor 45 is journalled in the bearings 44 and carries a circular saw blade 46 at one end and a pulley 47 at the other end. The saw blade projects through the slot 21 in the table insert 20, and the tilting axis of the yoke lies substantially in the plane of the saw blade. The web of the yoke 31 is at the side thereof remote from the saw blade. The yoke is of such character that it can be cast simply and economically. The arm 41 carries a downwardly projecting sector gear 48 which meshes with a worm 49 on a horizontal shaft 50 journalled in projecting parts of the front and rear trunnions and extending through an arcuate slot 51 in the front wall of the frame 15, the slot being concentric with the trunnion axis. The worm 49 is secured by a set-screw 52 to the shaft 50 and bears against the inner face of the front trunnion 32 through an interposed thrust washer 53. The outer end of the shaft 50 has a hand-wheel 54 secured thereon by a set-screw 55. A sleeve 56 surrounds the outer portion of the shaft 50 and has a flanged inner end bearing against the outer face of the trunnion 32. As best seen in Figs. 9 and 10, the outer end of the sleeve is notched to form a plurality of peripherally-spaced fingers 57 which slidably fit in grooves or channels 58 formed in the hub of the hand-wheel 54, the grooves terminating short of the outer end of the hub. A peripherally notched washer 59 (Figs. 9 and 11) fits in the internally grooved hub at the outer end of the shaft 50 and has an opening 60 through which passes the shank of a hand-screw 61 threaded into the end of the shaft, the head of the hand-screw bearing on the front face of the washer. Certain features of the tiltable saw carriage and its mounting are described and claimed in my co-pending application for Tilting arbor saws, Serial No. 252,744, filed January 25, 1939.

The rotation of the worm shaft 50 by the hand-wheel 54 swings the sector gear 48 on the arbor-supporting arm 41, thereby adjusting the elevation of the saw blade. By tightening the hand-screw 61, the washer 59 presses inwardly on the fingered outer end of the sleeve 56, thereby forcing the flanged inner end of the sleeve against the front trunnion and locking the worm shaft 50 against rotation. The arbor supporting arm 41 is thereby locked in adjusted position.

One of the trunnions, preferably the front trunnion 32, has a sector gear 62 formed thereon to mesh with a worm 63 carried on a horizontal shaft 64 journalled in bearings 65 and 66 secured to the opposite side walls of the frame 15, the shaft being suitably held against axial movement, as by closing the bearing 65 at its outer end and by mounting a collar 67 on the shaft 64 in engagement with the inner end of the bearing 66. One end of the shaft projects through the frame and carries a hand-wheel 68. Rotation of the shaft 64 by the hand-wheel serves to adjust the angular position of the tiltable trunnioned yoke 31 and the saw blade rotatably carried by the yoke. The shaft 64 is locked in the same manner as the shaft 50, the former shaft having a clamping sleeve 56' similar to the sleeve 56. Adjustable set-screws 69 and 70 carried on the front trunnion are engageable with the underside of the table to determine the vertical position and maximum tilted position of the saw blade, the latter position being usually 45° to the vertical. The set-screws 69 and 70 are disposed in a vertical plane passing axially through the shaft 64, so as to avoid distortion or weaving of the saw mounting when the set-screws are brought into engagement with the table. A sector scale 71 is secured to the front wall of the saw frame adjacent the arcuate slot 51 and cooperates with an index pointer 71' projecting through the slot and secured to an arcuate cover plate 72 for the slot, the plate being secured to the front trunnion 32 by brackets 72' and engaging the inner face of the front wall of the saw frame. Certain features of the adjusting, stopping and locking means for the saw mechanism are described and claimed in my copending application for Tilting arbor saw adjustments, Serial No. 259,095, filed March 1, 1939.

A splitter 73 is detachably secured by screws 74 to the rear portion of the yoke and projects upwardly through the saw slot 21 to the rear of the saw blade. The splitter is accessible for removal and replacement after removing the detachable insert plate 20.

A motor-supporting plate 75 slidably bears on the outer face of the rear frame wall and has an arcuate rib 76, as seen in Figs. 3, 5, and 7, which slidably fits in the rear groove 29 of the rear trunnion bracket 26 to define a tilting axis for the plate and to support the plate vertically. The inner face of the plate has an embossment 77 to which a sector gear 78 is secured by screws 79. A retainer 80 of Z-shaped cross-section is secured to the rear frame wall by screws 81 and has a flanged portion which engages the rear face of the sector gear 78 to hold the motor-supporting plate against the rear wall of the frame. An opening 82 in the plate affords access to the retainer.

The lower portion of the plate 75 has ears 83 to which are pivotally secured, by a pivot rod 84, ears 85 of a base plate 86, the pivot rod extending parallel to the saw arbor. An electric motor 87 is secured to the base plate and has a rotor shaft 88 extending parallel to the saw arbor 45. The mounting above described permits tilting movement of the motor toward and away from the rear wall of the frame. The motor base plate 86 is connected to the arbor-supporting arm 41 by an adjustable link 89 having a pivotal engagement at its upper end with a lug 90 on the arm, and having a pivotal engagement at its lower end with a lateral extension 91 of the motor base. A turnbuckle 92 on the link provides for adjustment of belt tension. The motor shaft 88 carries a pulley 93 which is connected to the saw arbor pulley 47 by one or more V-belts 94, the link and the V-belts passing through an opening 95 in the rear wall of the frame. The link serves to maintain the proper distance between the pulleys in the various adjusted positions of the saw arbor.

The motor pulley and rear portions of the belts are enclosed by complementary guard members 96 and 97, the former being secured to the plate 75 by screws 98, and the latter being detachably secured to the former by studs 99 and wing nuts 100.

Means are provided for tilting the motor and saw arbor in unison, and in the present instance such means comprises gearing connections between the front trunnion 32 and the motor-supporting plate 75. A spur gear 101 mounted on a stub shaft 102 meshes with the sector gear 62 of the front trunnion 32, the stub shaft being secured to the front trunnion bracket 23. A second spur gear 103 is secured to the spur gear 101 and meshes with a spur gear 104 secured to a cross-shaft 105 journalled at opposite ends in the front and rear trunnion brackets 23 and 26. A spur gear 106 is secured to the rear portion of the cross shaft 105 and meshes with a spur gear 107 on a short shaft 108 journalled in the rear trunnion bracket, the latter having apertured bearing bosses 109 and 110 to receive the shafts 105 and 108, respectively. The shaft 108 projects through the rear wall of the saw frame and the projecting end of the shaft carries a spur gear 111 which meshes with the sector gear 78 secured to the motor-supporting plate 75. Through the gearing connections above described the tilting of the trunnioned yoke will cause a corresponding tilting movement of the motor-supporting plate, so that no twisting of the belts will occur, the arbor pulley and motor pulley maintaining the same relative position. The opening 95 in the rear wall of the frame is made sufficiently large to provide belt clearance in all adjusted positions of the motor.

In the modified form of construction shown in Fig. 12, the sector gear 62' of the front trunnion 23' is of large radius (compared with the saw radius) so as to permit simplification of the gearing connections. The cross shaft 105' directly carries the spur gears which mesh with the front trunnion sector gear and motor-carrying plate sector gear, the front spur gear 101' being shown. In this construction, the saw blade when fully retracted may swing to its 45° position past the cross shaft and without striking the cross shaft.

When the circular saw is to be used, the elevation of the saw blade above the table is adjusted by rotating the hand-wheel 54, as hereinbefore described, causing the arbor-carrying arm 41 to swing on its pivot pin 39. This adjustment also swings the motor 87 on its pivot rod 84, through the link 89, thus substantially maintaining the distance between the saw arbor and motor shaft to preserve the desired belt tension. The hand-screw 61 locks the parts in this adjustment. Only a relatively small part of the motor weight is transmitted by the link to the arbor-carrying arm 41, thereby avoiding heavy pressures on the pivot pin 39 and worm gearing 48, 49, and permitting easy adjustment. The motor moves through a relatively small arc about the pivot rod 84. When the work is to be cut on a bevel, the saw blade is adjustably tilted by rotating the hand-wheel 68, as hereinbefore described, causing the trunnioned arbor-carrying yoke to swing on the trunnion brackets. The motor-supporting plate is swung simultaneously through the gearing connection including the cross-shaft 105, so that the arbor and motor shaft remain in the same relative position, avoiding twisting of the belt and change in the belt tension. A 45° tilted position of the motor is indicated by dotted lines in Fig. 3. The plate 75 and the motor thereon are retained in adjusted position by the gearing connection.

Since the trunnioned arbor-supporting yoke is required to sustain only a relatively small load, the yoke and its pivotal mounting can be of lightweight and economical construction.

The modified form of machine shown in Figs. 13 to 17 includes a saw frame 115 and table 117 similar to the frame and table of the Fig. 1 machine. Front and rear trunnion brackets 123 and 126 are secured to the frame and tiltably carry thereon front and rear trunnions 132 and 133 secured to the ends of a yoke 31. The yoke carries a belt-driven saw as in the Fig. 1 machine, the belts 94 passing through an opening 195 in the rear frame wall. An arcuate slot 151 is formed in the front wall of the frame to pass the shaft 50 and index pointer 71'. The slot is covered at its rear by a cover plate 172 secured by screws 172' to the front trunnion 132. The front trunnion has a sector gear 162 meshing with a worm 163 on a shaft 164 similar to the shaft 64. Stop screws 169 and 170 for limiting the angular movement of the front trunnion 132 are carried on brackets 169' and 170', respectively, secured to the front wall of the frame. The stop screws are in the vertical plane of the arbor-tilting shaft, as in the machine of Fig. 1.

The electric motor 87 is mounted on a base plate 186 which is pivoted by a rod 184 on a supporting plate 175 similar to the plate 75, and the belts 94 are protected by a two-part guard 197 having a securing stud 199. The supporting plate 175 is trunnioned on the rear trunnion bracket 126 by an arcuate rib 176 on the former slidably fitting in an arcuate groove 129 in the latter, and has embossments 177 to which a sector gear 178 is secured by screws 179. A retainer 180 of Z-shaped cross-section is secured to the rear frame wall and engages the upper plain arcuate edge of the sector gear. An opening 182 in the plate 175 affords access to the retainer.

The shaft 164 carries a second worm 163' which meshes with a pinion 201 carried on a cross-shaft 205 journalled at opposite ends in bearings 209 secured to the front and rear frame walls. The rear end of the shaft 205 extends through the rear frame wall and carries a pinion 211 meshing with the lower toothed edge of the sector gear 170. The pinion 211 is a little larger in pitch diameter than the pinion 201. By this gearing connection the arbor mounting and motor mounting are tilted in unison. The arbor mounting is relieved of the unbalanced weight of the tilted motor.

The arcuate rib 136 of the front trunnion fits in an arcuate groove 125 formed in the front trunnion bracket. At a central portion of the bracket the upper wall of the groove is cut away to receive an arcuate clamping shoe 212 bearing on the rib 136. The upper face of the shoe has a cam surface engaged by a wedge block 213 fitting in a correspondingly shaped recess in the bracket. A hand-screw 214 at the front wall of the frame is threaded into the wedge block. By turning the hand-screw in one direction the wedge block is drawn forward, pressing the clamping shoe downward, the latter in turn having a clamping engagement with the trunnion rib to hold the trunnion in adjusted position.

The rear trunnion 133 has an arcuate rib 137 which slidably fits in an arcuate groove 128 in the rear trunnion bracket 126. The arcuate rib 137 is here shown to have a somewhat smaller radius than the front trunnion rib 136, the difference in radius providing greater resistance to misalignment of the trunnioned yoke with respect to the trunnion brackets.

While the cutting member for each machine is indicated to be a saw, it will be obvious that other cutting members may be used, such as abrasive disks and cutter-heads, an example of the latter shown in my United States Letters Patent No. 1,830,813, issued November 10, 1931.

What I claim as new and desire to secure by Letters Patent is:

1. In a circular saw machine or the like, the combination of a frame having a work table and having a wall below said table, an arbor support having a tiltable mounting on said frame and disposed at the front of said wall, a cutter arbor on said support, a motor support having a tiltable mounting on said frame at the rear of said wall and separate from said arbor support tiltable mounting, said motor support being swingable about an axis substantially in alignment with the arbor support axis, a motor on said motor support, a driving belt connecting said arbor and the motor shaft, and means for tilting said supports in unison to vary the inclination of said cutter arbor and to maintain said motor and arbor in substantially the same relative position.

2. In a circular saw machine or the like, the combination of a frame having a rear wall, a trunnion bracket having front and rear portions and carried on said rear wall, an arbor support tiltably mounted on said frame and having a trunnioned engagement with the front portion of said bracket, a cutter arbor on said support, a motor support trunnioned on the rear portion of said bracket separately from said arbor support and swingable about an axis substantially in alignment with the arbor support axis, a motor on said motor support, a driving belt connecting said arbor and the motor shaft, and means for tilting said supports in unison to vary the inclination of said cutter arbor and to maintain said motor and arbor in substantially the same relative position.

3. In a circular saw machine or the like, the combination of a frame having front and rear walls, an arbor support extending between said walls and tiltably mounted on said walls, said support having a sector gear adjacent one of its end portions, a cutter arbor on said support, a motor support tiltably mounted at the rear of said rear wall separately from said arbor support, a motor on said motor support, a driving belt connecting said arbor and the motor shaft, a sector gear on said motor support, and gearing connections with said sector gears for tilting said supports in unison.

4. In a circular saw machine or the like, the combination of a frame having front and rear walls, a saw table secured to said frame and having a saw opening, a tiltable arbor support extending between said walls and trunnioned on said walls, a saw arbor shiftably carried by said support for raising and lowering said arbor, a motor support pivotally carried on said rear frame wall separately from said arbor support and swingable about an axis substantially in alignment with the arbor support axis, a motor on said motor support, a driving belt connecting said motor and arbor, and means for adjusting the angular position of the motor support to substantially correspond with the angular position of the arbor support.

5. In a circular saw machine or the like, the combination of a tiltable arbor support having a sector gear, a tiltable motor support having a sector gear, said supports having individual tiltable mountings, a cutter arbor on said arbor support, a motor on said motor support, a driving belt connecting said arbor and the motor shaft, means for tilting one of said supports, pinions meshing with said respective support gears, and a gearing connection between said pinions including a shaft for causing said supports to tilt in unison.

6. In a circular saw machine or the like, the combination of a tiltable arbor support having a sector gear, a tiltable motor support having a sector gear, said supports having individual tiltable mountings, a cutter arbor on said arbor support, a motor on said motor support, a driving belt connecting said arbor and the motor shaft, means for tilting one of said supports, and a shaft having gearing connections with said sector gears for causing said supports to tilt in unison.

7. In a circular saw machine or the like, the combination of a frame having a work table, an arbor support tiltably mounted on said frame, a motor support tiltably mounted on said frame, said supports having separate and individual tiltable mountings on said frame, a cutter arbor on said arbor support, a motor on said motor support, a driving belt connecting said arbor and the motor shaft, a sector gear on said motor support, gearing means meshing with said sector gear to tilt said motor support, and means slidably engaging said sector gear for confining said motor support against axial movement.

HERBERT E. TAUTZ.